United States Patent
Dudar et al.

(10) Patent No.: US 9,809,441 B2
(45) Date of Patent: Nov. 7, 2017

(54) SYSTEMS AND METHODS FOR PREVENTING FUEL TANK OVERFILLING

(71) Applicant: Ford Global Technologies, LLC, Dearborn, MI (US)

(72) Inventors: Aed M. Dudar, Canton, MI (US); Dennis Seung-Man Yang, Canton, MI (US); Sheven Sharp, Troy, MI (US); Russell Randall Pearce, Ann Arbor, MI (US); Donald Ignasiak, Farmington Hills, MI (US); Bryan Michael Bolger, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 14/976,699

(22) Filed: Dec. 21, 2015

(65) Prior Publication Data

US 2017/0174501 A1 Jun. 22, 2017

(51) Int. Cl.
*B67D 7/32* (2010.01)
*B67D 7/04* (2010.01)
(Continued)

(52) U.S. Cl.
CPC ...... *B67D 7/3272* (2013.01); *B60K 15/03504* (2013.01); *B60K 15/061* (2013.01);
(Continued)

(58) Field of Classification Search
CPC ........ B67D 7/04; B67D 7/048; B67D 7/0492; B60K 15/061; B60K 15/03504; B60K 2015/03566; B60K 2015/30576
See application file for complete search history.

(56) References Cited

U.S. PATENT DOCUMENTS 4,024,887 A * 5/1977 McGregor ............. F15C 1/003
 137/386
5,245,870 A * 9/1993 Hartel .................. B60K 15/061
 73/149

(Continued)

FOREIGN PATENT DOCUMENTS

WO 2010104379 A2 9/2010

OTHER PUBLICATIONS

Anonymous, "Vehicle Refuel Trickle Fill Effect Mitigation," IPCOM No. 000242830, Published Aug. 21, 2015, 2 pages.

*Primary Examiner* — Timothy L Maust
(74) *Attorney, Agent, or Firm* — James Dottavio; McCoy Russell LLP

(57) ABSTRACT

Methods and systems are provided for enabling a vehicle operator to select a desired amount of fuel to add to a fuel tank, and wherein overfilling of the tank is prevented by pressurizing the fuel system with an onboard pump. In one example, the tank may be sealed to induce an automatic shutoff of a refueling dispenser if the fuel level is below the capacity of the tank, and in another example, wherein it is indicated that the tank is full, the fuel system may be pressurized via the pump to induce automatic shutoff of the refueling dispenser and to prevent further overfilling of the tank. In this way, vehicle operators may add desired amounts of fuel to the tank wherein shutoff of the refueling dispenser is automatic, and wherein liquid fuel entering an evaporative emissions control system as a result of overfilling a fuel tank is prevented.

15 Claims, 7 Drawing Sheets

(51) Int. Cl.
*B60K 15/035* (2006.01)
*B60K 15/06* (2006.01)
*B60K 15/03* (2006.01)

(52) U.S. Cl.
CPC ............... *B67D 7/04* (2013.01); *B67D 7/048* (2013.01); *B67D 7/0492* (2013.01); *B60K 2015/0319* (2013.01); *B60K 2015/03217* (2013.01); *B60K 2015/03576* (2013.01)

(56) References Cited

U.S. PATENT DOCUMENTS

| | | | |
|---|---|---|---|
| 5,673,736 A * | 10/1997 | Farkas | B67D 7/362 137/202 |
| 5,979,481 A | 11/1999 | Ayresman | |
| 6,260,544 B1 * | 7/2001 | Spry | B60K 15/03504 123/516 |
| 6,601,617 B2 | 8/2003 | Enge | |
| 6,698,692 B1 | 3/2004 | Tichenor et al. | |
| 6,739,361 B2 * | 5/2004 | Krimmer | F02M 25/08 137/587 |
| 7,233,845 B2 | 6/2007 | Veinotte | |
| 7,296,600 B2 | 11/2007 | Ferreria et al. | |
| 7,347,191 B2 | 3/2008 | Atwood et al. | |
| 7,584,766 B2 * | 9/2009 | David | F16K 31/18 137/413 |
| 7,832,379 B2 * | 11/2010 | Schelhas | F02M 37/0023 123/510 |
| 7,866,356 B2 * | 1/2011 | Benjey | B67D 7/0476 141/198 |
| 8,479,763 B2 | 7/2013 | Hill et al. | |
| 8,678,050 B2 * | 3/2014 | Dobson | B60P 3/228 137/413 |
| 8,751,140 B2 | 6/2014 | Surnilla et al. | |
| 2015/0090006 A1 | 4/2015 | Peters et al. | |

* cited by examiner

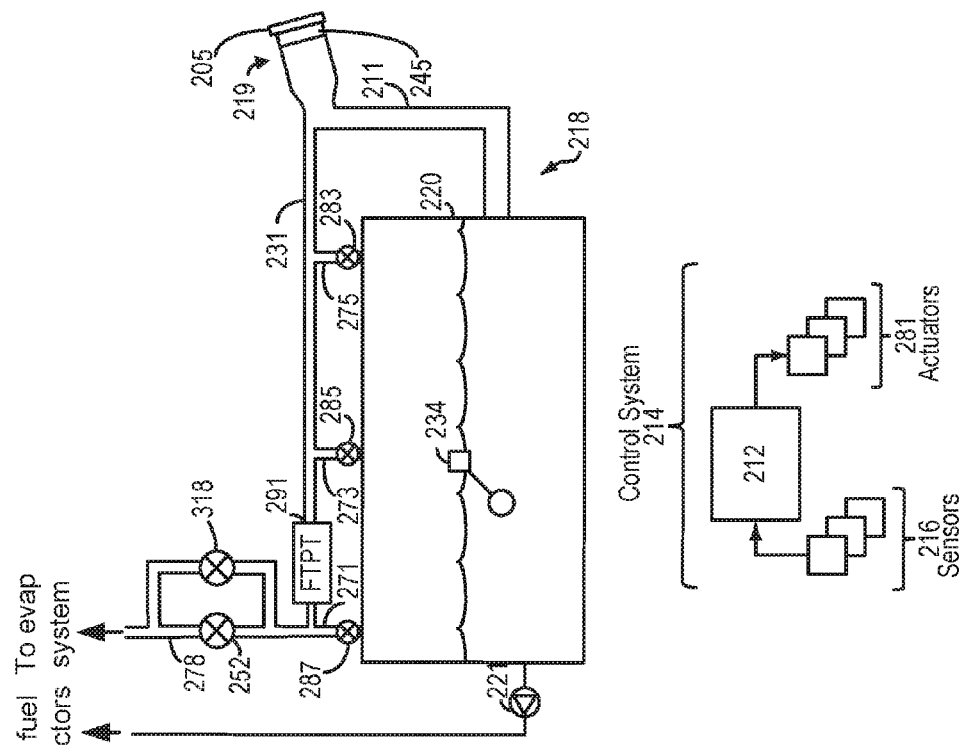
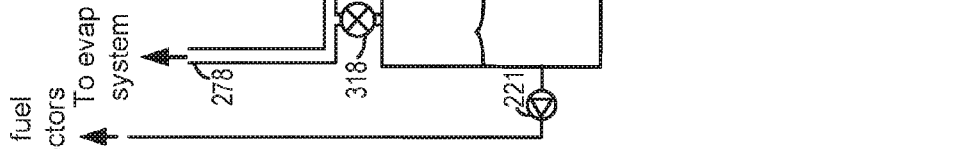
FIG. 3A
FIG. 3B

SYSTEMS AND METHODS FOR PREVENTING FUEL TANK OVERFILLING

FIELD

The present description relates generally to methods and systems for automatically shutting off refueling a fuel tank of a vehicle at a predetermined fuel level, and preventing fuel tank overfilling.

BACKGROUND/SUMMARY

Vehicles with an internal combustion engine may be fitted with fuel vapor recovery systems wherein vaporized hydrocarbons (HCs) released from a fuel tank are captured and stored in a fuel vapor canister containing a quantity of fuel-absorbing material such as activated charcoal. Eventually, the fuel vapor canister may become filled with an amount of fuel vapor. The fuel canister may be cleared of fuel vapor by way of a purging operation. A fuel vapor purging operation may include opening a purge valve to introduce the fuel vapor into the cylinder(s) of the internal combustion engine for combustion so that fuel economy may be maintained and fuel vapor emissions may be reduced.

Activated charcoal has been found to be a suitable fuel vapor absorbing material to be used in such a canister device because of its extremely porous structure and very large surface area to weight ratio. However, this porous structure can be blocked and lose its efficiency when coated with liquid fuel. This may occur if, for example, during refueling a pump operator adds fuel after an initial automatic shut-off. For instance, the maximum fill level for liquid fuel within a fuel tank is typically controlled by a mechanical shut-off valve that closes responsive to the level of liquid fuel in the tank. When this valve (frequently termed a fill limit vent valve) closes, pressure inside the tank increases thus causing liquid fuel to back up in a fill tube which actuates an automatic shut-off of a vehicle refueling pump nozzle, thus terminating the flow of fuel into the fuel tank. In an attempt to maximize the amount of fuel pumped into the tank, a pump operator may dispense additional fuel after an automatic shutoff, in what is commonly referred to as "trickle-filling". If, as a result of trickle-filling the fuel tank, liquid has entered the evap recovery lines and a purge cycle is commanded at the next engine start, the liquid can get sucked into the canister and corrupt the activated carbon. This may decrease the efficiency of the canister and lead to increased HC emissions. Additionally, if liquid fuel in the canister or purge line is purged to the intake, a reduction of engine power may result from an extremely low air-fuel ratio (A/F).

As the fuel limit vent valve is a passive mechanical valve, the FLVV reaction time must be designed, validated, and tested properly which involves time and resources. For example, mechanical FLVVs are typically designed based on the shape and size of the fuel tank in which they will operate, and as such one mechanical FLVV may not be suitable for use in a different fuel tank. Additionally, the fill level in a fuel tank may vary from one refueling event to another when mechanical FLVVs are relied upon for shutting off refueling dispensers, as repeatability between refueling events may vary, and over time the FLVV may develop hysteresis, stiction, and may not function per design. Furthermore, mechanical FLVVs may not prevent extensive trickle-filling after an initial automatic shutoff. In addition to the above-mentioned drawbacks to relying on mechanical FLVVs, fuel tanks frequently have other valves in addition to the FLVV, for example one or more grade vent valves (GVVs) that may close to prevent liquid fuel from entering evap recovery lines under circumstances wherein fuel level may be artificially raised, such as when parking on a steep slope or during a vehicle roll-over event. Including separate valves for individual functions in a fuel system increases costs and complexity. The inventors herein have recognized these issues.

Toward this end, U.S. patent application No. 7,347,191B2 teaches an electrically operated vent valve (EOVV) configured such that in an open position fuel vapor may be vented from a fuel tank, and wherein in a closed position fluid flow is restricted. The EOVV may be actuated by a controller, responsive to a signal to close the EOVV when the fuel tank is full, or nearly so, thus terminating venting from the fuel tank. As such, since fuel vapor cannot be displaced from the fuel tank with the EOVV closed, pressure within the fuel tank may build resulting in the triggering of an automatic shutoff of a refueling dispenser. U.S. patent application No. 7,347,191B2 further teaches that additional fuel (e.g., "rounding up" or "trickle-fill") may be permitted to be added to the fuel tank after a certain interval of time subsequent to an initial automatic shutoff event, by commanding the EOVV open, and subsequently closing the EOVV after a preprogrammed interval, for example. However, the inventors herein have recognized potential issues with such a method. For example, permitting additional fuel to be added subsequent to an initial automatic shutoff, wherein control over the additional refueling relies on a subsequent pressure build induced by adding fuel to the fuel tank in order to repeatedly shut off the refueling dispenser, may in some cases result in liquid fuel entering the evap lines. Furthermore, even if the EOVV were commanded closed and maintained closed to prevent any further addition of fuel to the fuel tank, maintaining the pressure in the tank above a threshold that may prevent any subsequent addition of fuel may be problematic without active control over the pressure in the fuel tank.

Thus, the inventors herein have developed systems and methods to at least partially address the above issues. In one example, a method is provided comprising, a vehicle operator selecting a desired fuel amount to add to a fuel tank via an onboard human machine interface (HMI, e.g., touch screen), and responsive to an indication that the desired amount of fuel has been added to the fuel tank, in a first condition wherein the fuel level is below a threshold fuel level (e.g., below fuel tank capacity), sealing the fuel tank to induce an automatic shutoff event, and in a second condition wherein the fuel level is greater than a threshold (e.g., the fuel tank at capacity), pressurizing the fuel tank with an onboard pump to induce an automatic shutoff event. In this way, when the fuel tank is full, active pressurization of the fuel tank may be utilized to impart control over the level of pressure in the fuel tank.

In one example, pressurizing the fuel tank with an onboard pump is maintained responsive to an automatic shutoff event, until it is determined that a refueling event is completed, for example by an indication that the refueling nozzle has been removed from a fuel filler neck. By actively maintaining pressure in the fuel tank via an onboard pump, subsequent attempts to add fuel to the fuel tank after an initial automatic shutoff may be prevented.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A schematically shows an example fuel system comprising a refueling valve in parallel with a pressure relief valve, a fuel level vent valve, and grade vent valves.

FIG. 3B schematically shows an example fuel system wherein a fuel level vent valve, and grade vent valve are not included, and wherein fuel level is indicated by a radar or ultrasonic fuel level sensor.

DETAILED DESCRIPTION

Figure 1:
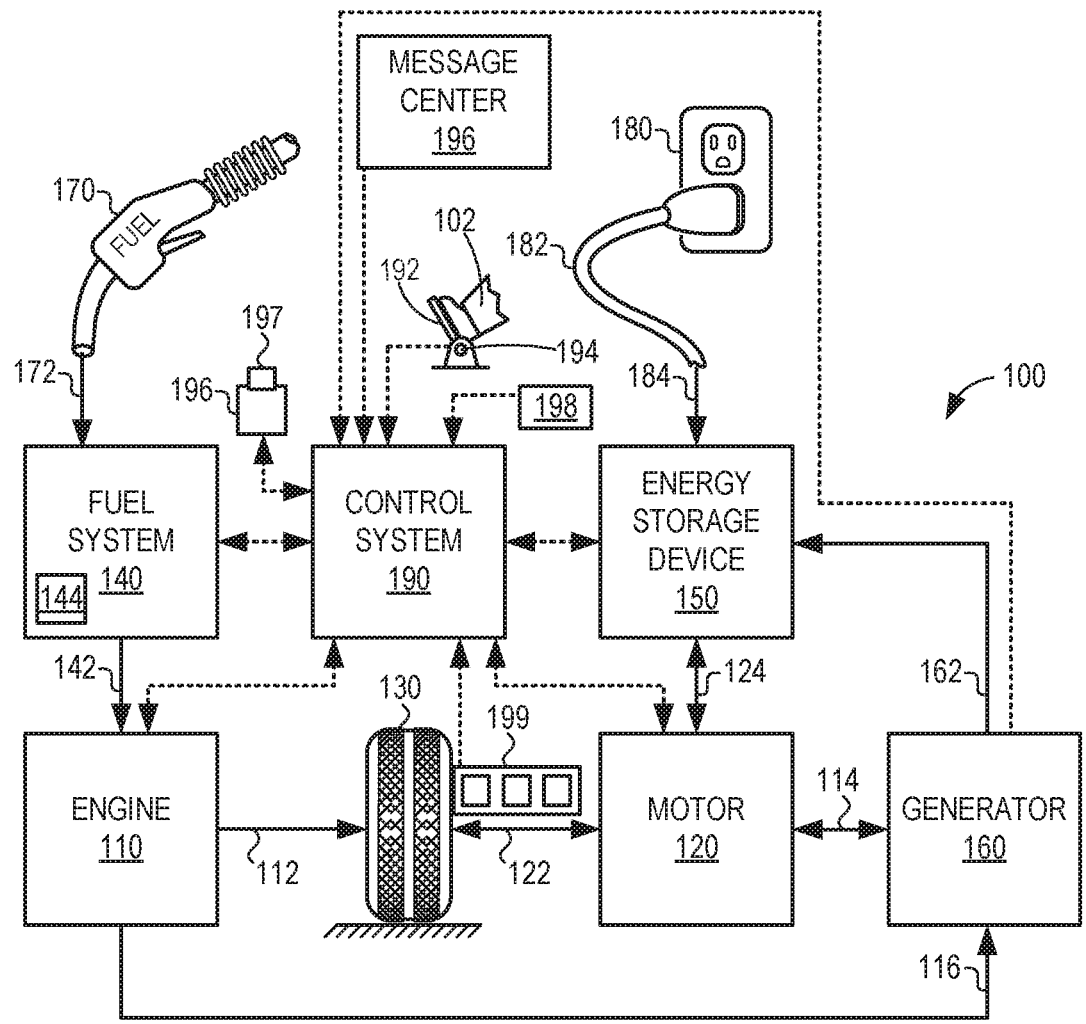
FIG. 1 schematically shows an example vehicle propulsion system.
Figure 2:
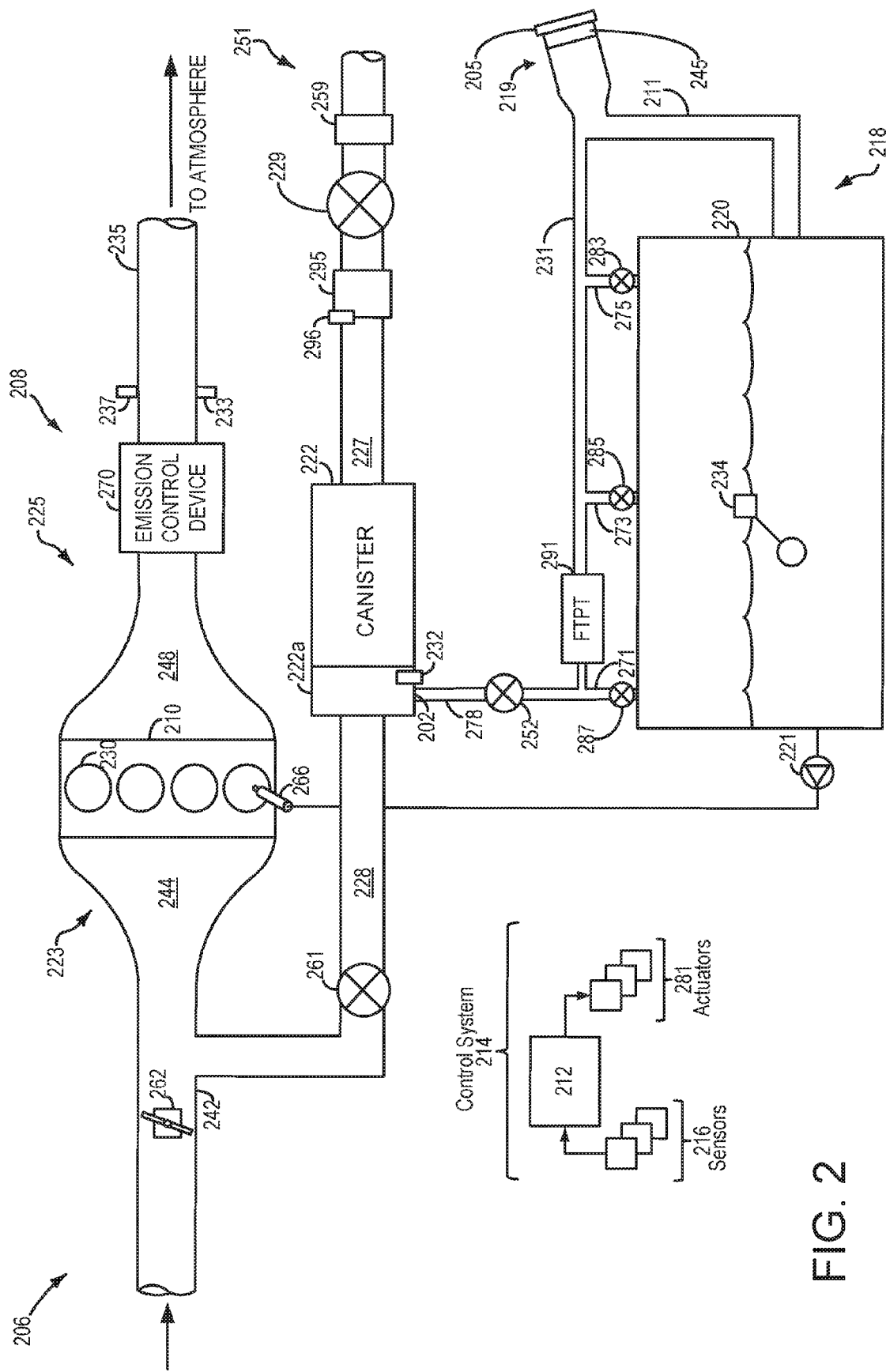
FIG. 2 schematically shows an example vehicle system comprising an engine system coupled to a fuel system and an evaporative emissions system.
Figure 4:
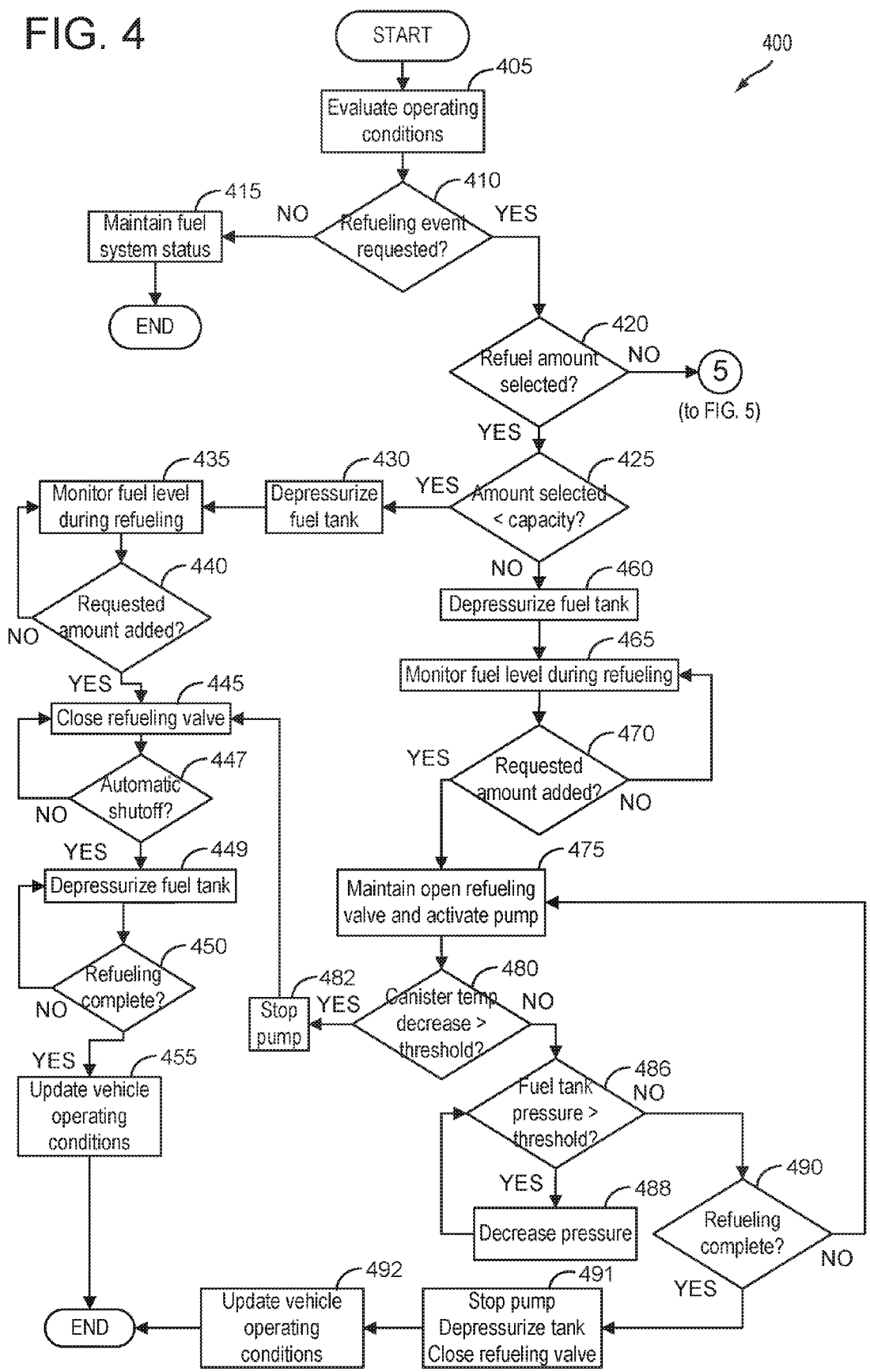
FIG. 4 shows an example method for selecting a desired refueling amount and automatically stopping refueling when the desired amount is reached.
Figure 5:
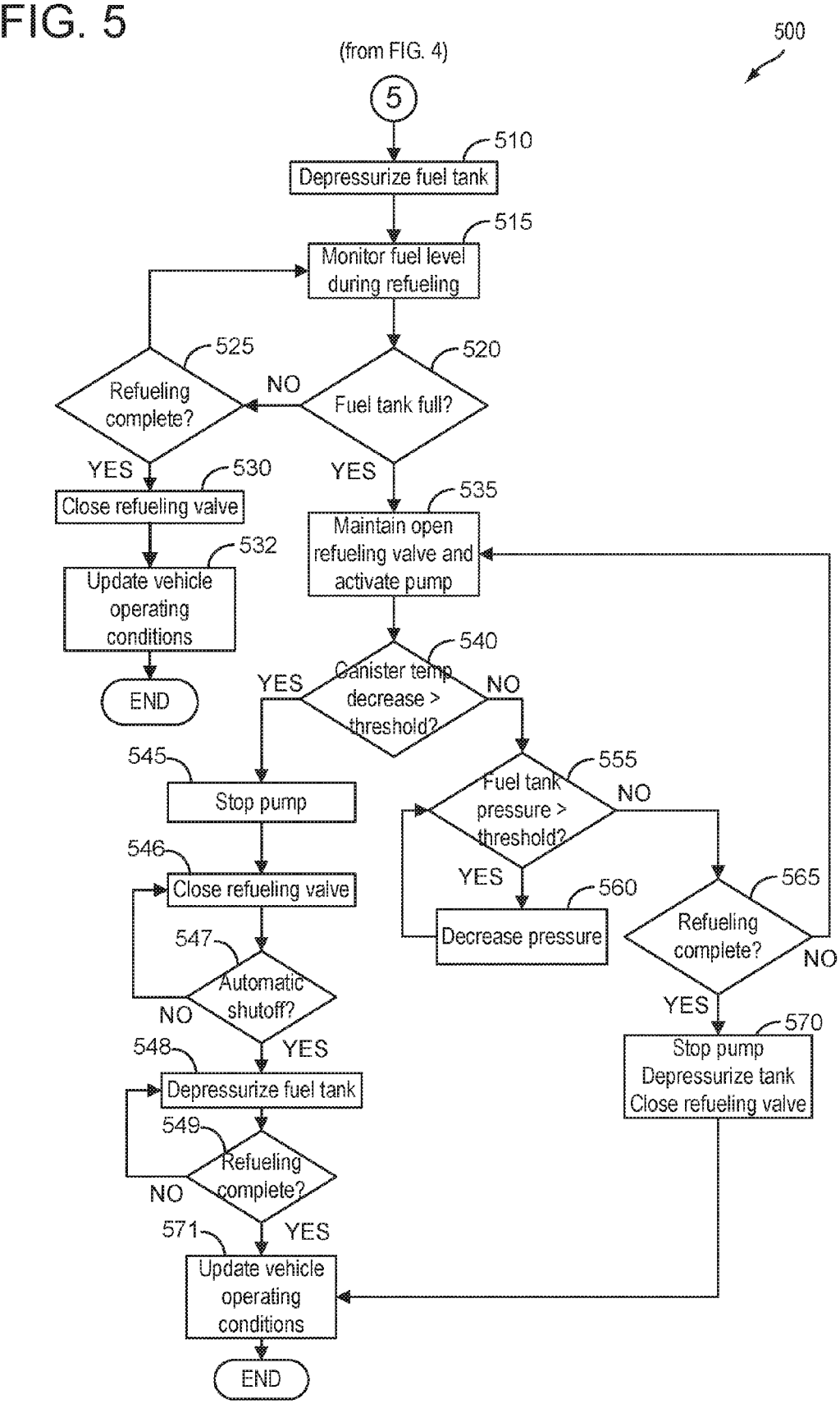
FIG. 5 shows an example method for preventing overfilling of a fuel tank during refueling if a desired refueling amount is not selected prior to commencing refueling.
Figure 6:
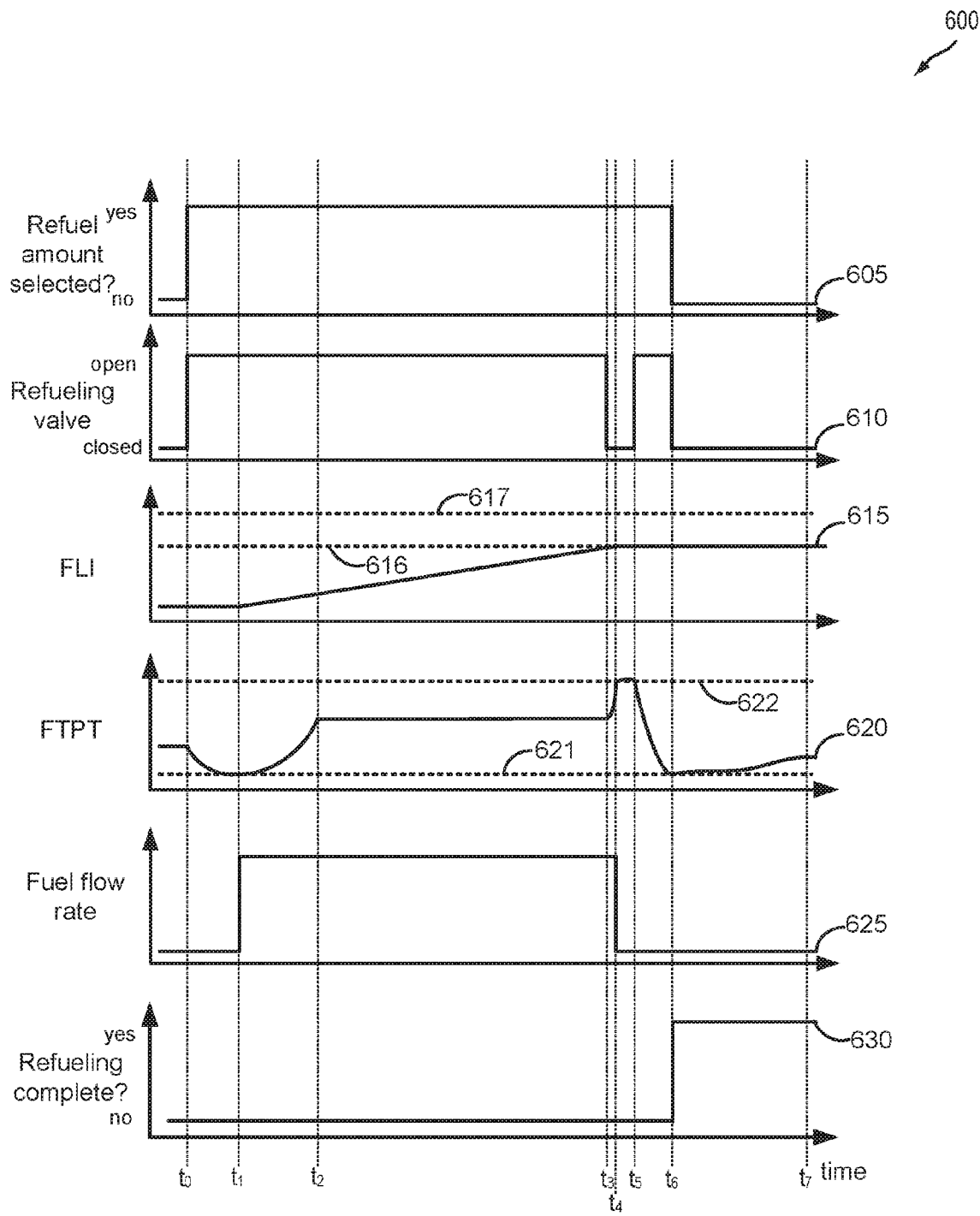
FIG. 6 shows an example timeline for automatically stopping refueling of a fuel tank after a preselected amount of fuel has been added to the fuel tank, according to the method of FIG. 4.

The following detailed description relates to systems and methods for enabling a vehicle operator to select a desired fuel amount to add to a fuel tank from an onboard human machine interface (HMI) or touch screen, and wherein refueling may be automatically stopped after the desired amount of fuel has been added to the fuel tank. Furthermore, the systems and methods described herein enable the prevention of overfilling of the fuel tank during refueling when it is indicated that the fuel tank is filled to capacity. The fuel tank may be included in a vehicle, such as a hybrid electric vehicle (HEV), as shown in FIG. 1. The vehicle may include a fuel system and an evaporative emissions (evap) control system, wherein the fuel tank is coupled to a fuel vapor canister via one or more fuel vapor recovery lines as shown in FIG. 2. Typically, a fuel system may include a pressure control valve in parallel with a refueling valve (herein referred to as a refueling valve or a fuel tank isolation valve (FTIV)), in addition to grade vent valves and a fuel limit vent valve, as shown in FIG. 3A. However, as described herein, the grade vent valves and the fuel limit vent valve may not be included in some cases, for example in the case of plug-in hybrid electric vehicle (PHEVs) or hybrid electric vehicles (HEVs) wherein the fuel tank is typically sealed except during refueling events and designed to withstand pressure changes typically associated with vehicle operating conditions and diurnal temperature cycles. In such cases, the fuel limit vent valve and grade vent valves may be replaced by a refueling valve (e.g., FTIV) and a pressure control valve in parallel, and wherein fuel level may be indicated by a fuel level sensor comprising, for example, an ultrasonic or radar sensor, as illustrated in FIG. 3B. FIG. 4 depicts an example method for enabling a vehicle operator to select a desired fuel amount to add to the fuel tank from an onboard human machine interface (e.g., touch screen), wherein refueling of the fuel tank may be automatically stopped after the desired amount of fuel has been added to the tank. If the fuel tank is filled to capacity, an onboard pump may be used to pressurize the fuel system, such that overfilling of the fuel tank may be prevented. FIG. 5 depicts an example method wherein a desired fuel amount is not selected prior to refueling a vehicle, and wherein overfilling of the fuel tank is prevented as described above with regard to the method of FIG. 4, by pressurizing the fuel system with an onboard pump. An example timeline for selecting a desired amount of fuel to add to a fuel tank and automatically shutting off refueling when the desired amount of fuel has been added is depicted in FIG. 6, and an example timeline for preventing the overfilling of a fuel tank by pressurizing the fuel system responsive to an indication of a fuel tank reaching capacity during refueling is depicted if FIG. 7.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed. In another example, described in further detail below, the vehicle instrument panel 196 may be configured such that a vehicle operator may select a desired amount of fuel to be added to a fuel tank during a refueling event. In one example, selecting a desired amount of fuel may comprise the use of a touch screen. In another non-limiting example, selecting a desired amount of fuel may comprise a voice command.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used, as will be described in further detail below with regard to FIG. 3B.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283 The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 34 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling. However, as described above and which will be described in further detail below, relying on a mechanical FLVV to accurately and repeatedly stop the addition of fuel to a fuel tank at the desired level may be problematic as repeatability over time is an issue with mechanical FLVVs. Furthermore, mechanical FLVVs may not prevent extensive trickle-filling after an initial automatic shutoff, and including separate valves for individual functions in a fuel system increases costs and complexity.

In some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister. In one example, as illustrated in FIG. 2 and described in further detail below, temperature sensor 232 may be positioned in close proximity to a load port 202 of the fuel vapor canister. Positioned as such, the temperature sensor may indicate when the fuel vapor canister is free of adsorbed hydrocarbons. For example, when the temperature as monitored by temperature sensor 232 decreases a threshold amount, it may be indicated that hydrocarbons have been desorbed in the vicinity of the load port, thus indicating a clean fuel vapor canister. However, in other examples, temperature sensors may be positioned at any point in the fuel vapor canister and configured to indicate canister loading state.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) (also referred to herein as "refueling valve") may control venting of fuel tank 220 with the atmosphere. Refueling valve 252 may be positioned between the fuel tank and the fuel vapor canister within conduit 278. Refueling valve 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open refueling valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open refueling valve 252 and canister vent valve 229, while maintaining canister purge valve 261 closed, to depressurize the fuel tank before enabling fuel to be added therein. As such, refueling valve 252 may be kept open during the refueling operation to allow refueling vapors to be stored in the canister. After refueling is completed, the refueling valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing refueling valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In another example of a canister purging mode, the controller 212 may open canister purge valve 261 and canister vent valve 229 while opening refueling valve 252 so that fuel vapors from fuel tank 220, in addition to desorbed fuel vapors from canister 222, are both purged into the engine air intake to be combusted in the engine.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, and canister temperature sensor 232. Other sensors such as pressure, temperature, air/fuel ratio, and composition sensors may be coupled to various locations in the vehicle system 206. As another example, the actuators may include fuel injector 266, throttle 262, refueling valve 252, evaporative level check monitor 295 (ELCM, described in further detail below), and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with reference to FIG. 4 and FIG. 5.

Evaporative emissions detection routines may be intermittently performed by controller 212 on fuel system 218 and evaporative emissions control system 251 to confirm that an undesired amount of evaporative emissions are not being released from the fuel system 218 and/or evaporative emissions control system 251. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions detection routines may be performed by an evaporative level check module (ELCM) 295 communicatively coupled to controller 212. ELCM 295 may be coupled in vent 227, between canister 222 and the atmosphere. ELCM 295 may include a vacuum pump configured to apply a negative pressure to the fuel system and/or evaporative emissions control system when in a first conformation, such as when administering an evaporative emissions diagnostic routine. ELCM 295 may further include a reference orifice and a pressure sensor 296. Following the applying of vacuum to the fuel system and/or evaporative emissions control system, a change in pressure at the reference orifice (e.g., an absolute change or a rate of change) may be monitored and compared to a threshold. Based on the comparison, undesired evaporative emissions in the fuel system and/or evaporative emissions control system may be diagnosed. As will be described in further detail below, the ELCM vacuum pump may be a reversible vacuum pump, and thus configured to apply a positive pressure to the fuel system and/or evaporative emissions control system when a bridging circuit is reversed placing the pump in a second conformation.

The refueling system and evaporative emissions system may be configured to sequester fuel vapors during refueling events, and further configured to trigger the shutoff of a refueling pump when the fuel level in the fuel tank increases above a threshold. For example, a float valve may be coupled to FLVV 285, and configured to close the valve when the fuel level reaches a threshold level. This may thus prevent fuel vapor from entering vapor recovery line 231, building a pressure in the fuel tank which triggers the automatic shutoff of the refueling pump. However, refueling operators may choose to "trickle fill" the fuel tank following the automatic shutoff, incrementally adding fuel to the fuel tank. If too much additional fuel is added, fuel may enter and become trapped within vapor recovery line 231. During a canister purging event, which may occur at the first engine-on event following the refueling event, the trapped liquid fuel may be drawn into the fuel vapor canister, temporarily decreasing the adsorbent's ability to adsorb. As such, systems and methods to at least partially address these issues have been developed, as will be elaborated in further detail herein.

FIG. 3A depicts a typical fuel system 300 as described with regard to the fuel system depicted in FIG. 2. Components that are the same as those illustrated in FIG. 2 are denoted by the same reference number. FIG. 3A further illustrates a pressure control valve 318 configured in parallel with the refueling valve (e.g., FTIV 252). The pressure control valve 318 may be controlled by the powertrain control module (e.g. controller 212) using a pulse-width modulation cycle to control any excessive pressure while the engine is running, to reduce the time for fuel tank depressurization prior to refueling, or even vent excessive pressure from the fuel tank when the vehicle is operating in electric vehicle mode, for example in the case of a hybrid electric vehicle. However, all future hybrid electric vehicles (HEVs) may comprise a sealed fuel tank designed to withstand pressure fluctuations typically encountered during normal vehicle operation and diurnal temperature cycles (e.g., steel fuel tank). For example, previously only plug-in hybrid electric vehicles (PHEVs) were designed with sealed fuel tanks (also referred to as NIRCOS, or Non Integrated Refueling Canister Only System). Future HEVs may additionally comprise sealed fuel tanks, as engine run time in HEVs is limited, thus limiting opportunities for fuel vapor canister purging operations. The sealed fuel tank may prevent any diurnal and running loss vapors from loading the fuel vapor canister, wherein only refueling vapors may contribute to fuel vapor canister loading. As described above, mechanical FLVV reaction times must be designed, validated, and tested properly, involving time and resources. Furthermore, mechanical FLVVs may not prevent excessive trickle-filling after an initial automatic shutoff, and as indicated, fuel tanks typically have other valves in addition to the FLVV, for example GVV 271 and GVV 275. As future HEVs may comprise sealed fuel tanks, it is herein recognized that the refueling valve (e.g. 252) in series with the FLVV (e.g., 273) and GVVs (e.g. 271 and 275) comprise redundant valves, and as such, the FLVV and GVVs may be eliminated in future HEVs.

Now turning to FIG. 3B, a fuel system 305 is illustrated as described with regard to the fuel system depicted in FIG. 3A (and FIG. 2). Components that are the same as those illustrated in FIG. 3A (and FIG. 2) are denoted by the same reference number. The fuel tank 220 in FIG. 3B may be understood to comprise a steel fuel tank (e.g., NIRCOS, or Non Integrated Refueling Canister Only System). As such, as described above with regard to FIG. 3A, the FLVV and GVVs are not included in fuel system 305, as in a NIRCOS fuel tank the passive mechanical FLVV and GVVs are redundant when plumbed in series with the active refueling valve (e.g., 252) and active pressure control valve (e.g., 318). Instead of relying on the FLVV to shut off a refueling dispense pump once the fuel level reaches a maximum capacity level, the refueling dispense pump may be shut off as described below. For example, the refueling valve 252 may comprise a latchable solenoid valve wherein when a voltage pulse (100 ms) is applied to the solenoid coil the valve may be opened or closed. In one example, when a refueling button (e.g., 197 in FIG. 1) is pressed to open a fuel door, a voltage pulse may be applied to open the refueling valve 252. During refueling, fuel vapors may be directed to the fuel vapor canister via the open refueling valve 252. Furthermore, fuel level may be monitored during refueling by the non-contact, ultrasonic or radar fuel level sensor 317, and a signal may be transmitted to the controller (e.g., 212) to command the refueling valve to close at a predetermined fill level. By closing the refueling valve 252 responsive the fuel level reaching a predetermined fill level, pressure may build in the fuel tank thereby inducing an automatic shutoff of a refueling dispenser. As described above and which will be described in further detail below, in one example the predetermined fuel fill level may comprise any desired amount of fuel selected by the operator of the vehicle via an onboard human machine interface (e.g., touch screen). In another example, responsive to the vehicle operator not selecting a desired fuel level prior to commencing refueling, the refueling valve may be commanded to close upon the fuel level in the tank reaching a predetermined maximum fill level (e.g., a full fuel tank). In still other examples, responsive to the vehicle operator selecting to fill the fuel tank to capacity via the above-described HMI, upon indication that the fuel level has reached capacity, the refueling valve may be maintained open and the fuel system may be pressurized via an onboard pump (e.g., ELCM 295 in FIG. 2), wherein the increased pressure in the fuel system may induce an automatic shutoff of the refueling dispenser and may further prevent subsequent attempts to add additional fuel to the tank. By removing the FLVV and GVVs from the fuel system and including an ultrasonic or radar fuel level sensor, the fill level accuracy during refueling may be improved as the ultrasonic or radar fuel level sensor may precisely monitor the fuel level and command the refueling valve 252 to close responsive to a desired fill level being indicated. As such, the typical variability observed when relying on a mechanical FLVV may be reduced or eliminated. Furthermore, potential corking issues that may occur with mechanical valves during high pressure tank de-pressurization may additionally be eliminated. Finally, by removing redundant mechanical valves from the fuel system, valve costs, packaging, and weight considerations may be improved.

As depicted in FIG. 3B, the pressure control valve 318 and the refueling valve 252 are illustrated as being outside of the tank, though it may be appreciated that in other examples, the tank pressure control valve 318 and refueling valve 252, along with sections of the evap line (e.g., 231) may be contained wholly within the fuel tank without departing from the scope of the present disclosure.

Returning now to FIG. 3A, in some examples, if the FLVV and GVVs are maintained in the vehicle, the refueling valve (e.g., 252) may similarly be used to induce an automatic shutoff of a refueling dispenser. For example, responsive to a vehicle operator selecting any desired amount of fuel to add to the fuel tank via a HMI, upon the fuel level reaching a level indicating that the desired amount of fuel has been added, the refueling valve may be commanded to close as described above (e.g., a signal may be transmitted to the controller (e.g., 212) to command the refueling valve to close). In one such non-limiting example, the FLVV may be included as a redundant valve, wherein if the fuel level reaches a threshold amount and closing of the refueling valve did not shut off the refueling dispenser, the FLVV may thus close, inducing a pressure build that may shut off the refueling dispenser. Furthermore, in another example wherein the FLVV and GVVs are maintained in the vehicle, responsive to a fuel level reaching a predetermined amount (e.g., full fuel tank), the refueling valve may be maintained open and the fuel system pressurized by an onboard pump (e.g., ELCM 295 in FIG. 2) to induce an automatic shutoff of the refueling dispenser. Another example may include maintaining the refueling valve open and pressurizing the fuel system via the onboard pump (e.g., ELCM 295 in FIG. 2) responsive to an indication of one or more automatic shutoff events (e.g., pressurizing after an indication of three automatic shutoff events), the automatic shutoff events induced by closing of the FLVV. In any of the above-mentioned examples, the fuel level may be monitored by any suitable fuel level sensor as described above, for example a float connected to a variable resistor, such as fuel level sensor 234.

Turning to FIG. 4, a flow chart for an example method 400 for automatically shutting off refueling a fuel tank of a vehicle at a predetermined fuel level, and preventing fuel tank overfilling is shown. More specifically, method 400 may be used to enable a vehicle operator to select a desired amount of fuel to add to a fuel tank via an onboard human machine interface or touch screen, and responsive to an indication that the desired amount of fuel has been added during refueling, an automatic shutoff of the refueling dispenser may be induced. Furthermore, to prevent fuel tank overfilling, if the desired amount of fuel to be added to the fuel tank results in the fuel level in the fuel tank reaching the capacity of the fuel tank, an onboard pump may be used to pressurize the fuel system, thus inducing automatic shutoff of the refueling dispenser and preventing the further addition of fuel to the tank. In this way, method 400 may enable a vehicle operator to add a desired amount of fuel to a fuel tank, wherein the fuel dispenser may be automatically shut off when the desired amount is reached, and wherein overfilling the fuel tank is not permitted, thus reducing opportunities for liquid fuel entering the evaporative emissions control system line(s). Method 400 will be described with reference to the systems described herein and as shown in FIGS. 1-3, though it should be understood that similar methods may be applied to other systems without departing from the scope of this disclosure. It may be appreciated that method 400 specifically relates to the fuel system illustrated in FIG. 3B, wherein the FLVV and GVVs are not included. As such, reference will be made where appropriate as to the applicability of the method herein described with regard to the fuel system illustrated in FIG. 3A. Method 400 may be carried out by a controller holding executable instructions in non-transitory memory, such as controller 212 in FIG. 2. The controller may employ engine actuators of the engine system to adjust engine operation, according to the method described below. It should be understood that the method 400 may be applied to other systems of a different configuration without departing from the scope of this disclosure.

Method 400 begins at 405 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 410, method 400 includes indicating whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, the method 400 proceeds to 415, wherein method 400 includes maintaining the status of the fuel system, and may further include maintaining the status of the evaporative emissions system. For example, components such as the refueling valve (FTIV), CVV, CPV, ELCM, fuel pump, and refueling lock may be signaled by the controller to maintain their current conformation and/or activity. Method 400 may then end.

If at 410, a refueling event has been requested, method 400 proceeds to 420 and includes indicating whether a desired amount of fuel to be added during a refueling event has been selected. For example, a desired amount of fuel may be selected by a vehicle operator via a human machine interface located within the vehicle. In one example, the human machine interface may comprise a touch screen. In other examples, a voice command may be used to select a desired amount of fuel. In still other examples, selecting a desired amount of fuel may comprise selecting the desired amount from a wireless device, wherein the information may be transmitted wirelessly to the vehicle. If at 420, a desired refuel amount is not indicated to be selected, refueling the vehicle may proceed as described by the method detailed in FIG. 5. If, however, at 420 it is indicated that a desired refueling amount has been selected, method 400 proceeds to 425 and includes indicating whether the desired amount of fuel the vehicle operator has selected, added to the amount of fuel already present in the fuel tank, is less than the capacity of the fuel tank. For example, prior to the vehicle operator selecting a desired fuel amount to add to the vehicle, a current fuel level may be stored in the vehicle controller, such as controller 212 in FIG. 2. Subsequent to the vehicle operator selecting a desired amount of fuel to add to the fuel tank, at 425 the vehicle controller may add the selected amount to the current fuel level, and indicate whether the total amount of fuel is less than the capacity of the fuel tank. In some examples, if a desired fuel amount to add to the fuel tank as selected by the vehicle operator would result in a fuel level greater than the capacity of the fuel tank, an error message may be generated, indicating to the vehicle operator that the indicated desired fuel amount selected is an invalid selection. In one example, responsive to a vehicle operator selecting a fuel amount that would result in a fuel level greater than the capacity of the fuel tank, the vehicle operator may be alerted as to the maximum amount of fuel that may be added to the fuel tank. In still other examples, the vehicle operator may elect to select a "fill up" amount, wherein the refueling event may fill the tank to capacity. If at 425, the desired amount of fuel selected by the vehicle operator added to the current amount of fuel already in the tank is indicated to be less than the capacity of the fuel tank (in other words, less than a full fuel tank), method 400 proceeds to 430 and includes depressurizing the fuel tank. For example, at 430 method 400 may include the controller commanding open a refueling valve (e.g., 252), and opening or maintaining open a vent path between the fuel vapor canister and atmosphere (e.g., open CVV and/or ELCM changeover valve in a venting position), while maintaining a canister purge valve (e.g. CPV 261) closed, to depressurize the fuel tank before enabling fuel to be added therein. The refueling valve may be opened in a manner to depressurize the fuel tank at a predetermined rate, so as to prevent rapid depressurization which may cause damage to fuel system components (e.g., if the vehicle is equipped with FLVV and GVVs, which may cork shut due to rapid depressurization). A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The refueling valve and canister vent path may be maintained open for the duration of the refueling event, to allow refueling vapors to be flowed to the fuel vapor canister, and to allow gasses stripped of refueling vapors to be flowed to atmosphere.

Continuing at 435, method 400 includes monitoring fuel level during refueling of the vehicle. Monitoring fuel level may include the control system receiving information regarding the level of fuel stored in the fuel tank via one or more fuel level sensors, either continuously or at predetermined intervals over the duration of the refueling event. In some examples, a fuel level sensor may comprise a float connected to a variable resistor, such as fuel level sensor 234. In other examples, a fuel level sensor may comprise a radar or ultrasonic fuel level sensor. Proceeding to 440, method 400 includes indicating whether the requested amount of fuel has been added to the fuel tank. For example, the fuel level in the tank may be compared to the fuel level prior to commencing refueling, in order to determine whether the requested amount of fuel has been added to the fuel tank. In other words, a starting fuel level prior to commencing refueling may be continuously subtracted from a current fuel level as indicated by the one or more fuel level sensors as described above in order to indicate when the requested fuel amount has been added. If at 440 it is indicated that the requested amount has not been added, method 400 proceeds to 435 and includes continuing to monitor fuel level in the fuel tank as described above. Alternatively, if at 440 it is indicated that the requested amount of fuel has been added to the fuel tank, method 400 proceeds to 445 and includes closing the refueling valve to pressurize the fuel tank. Additionally, in some examples, indicating that the requested amount of fuel has been added to the tank may occur prior to the actual requested amount, and may be based on a calculation including the rate of fuel flow, fuel tank fill level, and the size/geometry of the fuel tank, such that by proceeding to 445 the actual requested amount of fuel may be added to the tank by compensating for the additional fuel that may be added to the tank during the time in which pressure increases in the tank, described in further detail below. As indicated above, the method herein described relates specifically to a fuel tank without FLVV or GVVs, however it may be understood that closing a refueling valve responsive to an indication that a requested amount of fuel has been added to the tank may be applicable to a fuel tank comprising FLVV and GVVs without departing from the scope of this disclosure.

As discussed, at 445, method 400 includes closing the refueling valve to seal the fuel tank. By closing the refueling valve pressure inside the tank may rapidly build thus causing liquid fuel to back up in a fill tube and thereby actuating an automatic shut-off of a refueling dispenser and terminating the flow of fuel into the tank. In some examples, by closing the refueling valve at an indicated time prior to the actual requested amount being added to the fuel tank, the amount of fuel added to the tank during the pressure build may be compensated for, as discussed above, such that the actual requested amount of fuel is added to the tank. Accordingly, at 447, method 400 includes indicating whether an automatic shutoff event has occurred. In one example, an automatic shutoff may be indicated when a fuel level has plateaued for a predetermined duration of time, or may be based on a fuel tank pressure characteristic of an automatic shutoff event. If, at 447, an automatic shutoff is not indicated, method 400 includes returning to 445, and maintaining closed the refueling valve. Alternatively, if at 447 an automatic shutoff event is indicated, method 400 proceeds to 449 and includes depressurizing the fuel tank, for example by commanding open the refueling valve, and when the fuel tank pressure is indicated to reach a predetermined threshold, commanding closed the refueling valve to seal the fuel tank.

Proceeding to 450, method 400 includes indicating whether the refueling event is complete. For example, completion of refueling at may include an indication that a refueling nozzle has been removed from the fuel filler neck, replacement of a fuel cap, closing of a refueling door, etc. If at 450 it is indicated that refueling is not complete, method 400 may return to 449 and may include maintaining closed the refueling valve. Alternatively, if at 450 it is indicated that refueling is complete, method 400 proceeds to 455, where vehicle operating conditions are updated based on the refueling event. For example a dashboard fuel gage, fuel level based parameters such as miles-to-empty, a canister loading state, and a canister purge schedule may be updated. Method 400 may then end.

Returning to 425, if the desired amount of fuel selected by the vehicle operator to add to the fuel tank, plus the current amount of fuel already in the tank, is indicated to be equal to the capacity of the fuel tank (in other words, a full fuel tank), method 400 proceeds to 460 and includes depressurizing the fuel tank. At 460, depressurizing the fuel tank may proceed as described above at 430. Briefly, at 460, method 400 may include the controller commanding open the refueling valve (e.g., 252), and opening or maintaining open a vent path between the fuel vapor canister and atmosphere (e.g. open CVV and/or ELCM changeover valve in a venting position), while maintaining a canister purge valve (e.g., CPV 261) closed, to depressurize the fuel tank before enabling fuel to be added therein. The refueling valve may be opened in a manner to depressurize the fuel tank at a predetermined rate, so as to prevent rapid depressurization which may cause damage to fuel system components, as described above. A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The refueling valve and canister vent path may be maintained open for the duration of the refueling event, to allow refueling vapors to be flowed to the fuel vapor canister, and to allow gasses stripped of refueling vapors to be flowed to atmosphere.

Continuing at 465, method 400 includes monitoring fuel level during refueling of the vehicle. Monitoring fuel level may include the control system receiving information regarding the level of fuel stored in the fuel tank via one or more fuel level sensors, either continuously or at predetermined intervals over the duration of the refueling event. As described above at 435, a fuel level sensor may comprise a float connected to a variable resistor, such as fuel level sensor 234, or a radar or ultrasonic fuel level sensor (e.g., 317). Proceeding to 470, method 400 includes indicating whether the requested amount of fuel has been added to the fuel tank. As described above at 440, the fuel level in the tank may be compared to the fuel level prior to commencing refueling, in order to determine whether the requested amount of fuel has been added to the fuel tank. If at 470 it is indicated that the requested amount has not been added, method 400 proceeds to 465 and includes continuing to monitor fuel level in the fuel tank as described above. Alternatively, if at 440 it is indicated that the requested amount of fuel has been added to the fuel tank, method 400 proceeds to 475.

At 475, method 400 includes maintaining open the refueling valve and activating an onboard pump (e.g., ELCM pump 295). Maintaining open the refueling valve and activating the onboard pump may direct air through the fuel vapor canister to the fuel tank, thereby pressurizing the fuel tank in order to induce an automatic shutoff of the refueling dispenser. In one example, the pump may be activated at a percent duty cycle such that the automatic shutoff of the refueling dispenser may occur within a predetermined time duration subsequent to pump activation. The pump may further be duty cycled such that the pressure in the fuel tank remains above a predetermined pressure required to induce an automatic shutoff of the refueling dispenser. As such, in one example the pump may initially be activated at a predetermined percent duty cycle, and following the fuel tank pressure reaching the predetermined pressure for inducing an automatic shutoff as monitored by a fuel tank pressure transducer (e.g., FTPT 291), the percent duty cycle may be reduced such that pressure in the fuel tank is maintained and the fuel tank is not overpressurized, as described in further detail below.

Proceeding to 480, following activation of the onboard pump to pressurize the fuel tank, canister temperature may be monitored in order to determine whether a canister temperature decrease greater than a threshold canister temperature decrease is indicated. For example, canister temperature may be monitored by a canister temperature sensor, such as temperature sensor 232. Activating the pump to pressurize the fuel tank at 475 may force air through the fuel vapor canister to the fuel tank, as described above. By routing air through the fuel vapor canister, hydrocarbons adsorbed in the fuel vapor canister may be desorbed, and may be directed to the fuel tank. As the process of hydrocarbon desorption is endothermic, as hydrocarbons are desorbed from the fuel vapor canister, temperature may decrease in the vicinity of the desorbed hydrocarbons. Positioning a temperature sensor near a load port (e.g., 202) of the fuel vapor canister and monitoring temperature while the onboard pump is activated, may thus indicate when the fuel vapor canister is free of hydrocarbons. For example, a temperature decrease greater than a threshold temperature decrease may indicate that hydrocarbons are being desorbed in the vicinity of the load port, thus indicating that the rest of the fuel vapor canister is free of hydrocarbons. As such, at 480, method 400 includes indicating whether fuel vapor canister temperature decrease is greater than a threshold. If, at 480, a canister temperature decrease greater than a threshold is indicated, method 400 proceeds to 482 and includes stopping the onboard pump. By way of an example, a refueling event in which the fuel tank was nearly full and is re-filled to capacity may not result in significant loading of the fuel vapor canister, such that when the pump is activated the fuel vapor canister may be indicated to be free of hydrocarbons. Stopping the pump when a temperature decrease greater than a threshold is indicated ensures that air free of hydrocarbons is not pushed into the fuel tank.

Method 400 proceeds to 445, and includes closing the refueling valve. As described above, by closing the refueling valve, pressure may build in the fuel tank thus inducing an automatic shutoff of the refueling dispenser. At 447, method 400 includes indicating whether an automatic shutoff event has occurred. If, at 447, an automatic shutoff is not indicated, method 400 includes returning to 445, and maintaining closed the refueling valve. Alternatively, if at 447 an automatic shutoff event is indicated, method 400 proceeds to 449 and includes depressurizing the fuel tank, for example by commanding open the refueling valve, and when the fuel tank pressure is indicated to reach a predetermined threshold, commanding closed the refueling valve to seal the fuel tank.

Proceeding to 450, method 400 includes indicating whether the refueling event is complete. For example, completion of refueling at may include an indication that a refueling nozzle has been removed from the fuel filler neck, replacement of a fuel cap, closing of a refueling door, etc. If at 450 it is indicated that refueling is not complete, method 400 may return to 449 and may include maintaining open the refueling valve. Alternatively, if at 450 it is indicated that refueling is complete, method 400 proceeds to 455, where vehicle operating conditions are updated based on the refueling event. For example a dashboard fuel gage, fuel level based parameters such as miles-to-empty, a canister loading state, and a canister purge schedule may be updated. More specifically, a canister loading state may be updated to indicate that the fuel vapor canister is free of hydrocarbons subsequent to the refueling event, and a canister purge schedule may be updated accordingly. In on example, updating a canister purge schedule may include postponing a canister purge at the next engine-on event. Method 400 may then end.

Returning to 480, if it is indicated that fuel vapor canister temperature decrease is not greater than a threshold, as monitored by a temperature sensor near the load port of the fuel vapor canister as described above, method 400 proceeds to 486. At 486, method 400 includes indicating whether a fuel tank pressure is greater than a threshold. For example, fuel tank pressure may be monitored by a fuel tank pressure transducer (e.g., FTPT 291), and the threshold may be a fuel tank pressure greater than a pressure level that may induce an automatic shutoff of the refueling dispenser (e.g., 16 InH2O). If at 486 it is indicated that fuel tank pressure is above a threshold, method 400 proceeds to 488 and includes decreasing the fuel tank pressure to a predetermined value that may induce an automatic shutoff of the refueling dispenser (e.g., 10 InH2O), but which is not greater than a threshold (e.g., 16 InH2O) as described at 486. At 488, decreasing fuel tank pressure may include duty cycling the change-over valve (COV) inside the pump (e.g., ELCM 295) open until the pressure is indicated to be below a threshold (e.g., 16 InH2O), but greater than a pressure that may induce an automatic shutoff of the refueling dispenser.

Returning to 486, if it is indicated that fuel tank pressure is not greater than a threshold, method 400 may proceed to 490. At 490, method 400 includes indicating whether refueling is complete. For example, at 490 completion of refueling may be indicated when the fuel level has plateaued (due to an automatic shutoff event), and when it is indicated that a refueling nozzle has been removed from the fuel filler neck, a fuel cap has been replaced, and/or a refueling door has been indicated to close. For example, if the fuel level has plateaued yet it is not indicated that one or more of the refueling nozzle has been removed, the fuel cap has been replaced, and/or the refueling door is closed, then method 400 proceeds to 475 and includes maintaining open the refueling valve and maintaining activation of the onboard pump. As such, pressure in the fuel tank may be maintained above a pressure level in which an automatic shutoff of the refueling dispenser may occur if any additional amount of fuel were attempted to be added to the fuel tank (e.g., 10 InH2O). In other words, by maintaining a predetermined pressure in the fuel tank, trickle-filling of the fuel tank may be prevented as any attempt to trickle-fill the tank may result in rapid automatic shutoff of the refueling dispenser.

Returning to 490, if it is indicated that refueling of the fuel tank is complete, method 400 proceeds to 491 and includes stopping the onboard pump, depressurizing the fuel tank by maintaining the refueling valve open, and subsequently closing the refueling valve responsive to a fuel tank pressure reaching a predetermined pressure threshold.

Proceeding to 492, method 400 includes updating vehicle operating conditions based on the refueling event. For example, a dashboard fuel gage, fuel level based parameters such as miles-to-empty, a canister loading state, and a canister purge schedule may be updated. More specifically, a canister loading state may be updated to indicate a fuel vapor canister loading state based on an estimated amount of hydrocarbons loaded into the fuel vapor canister during the refueling event minus the amount purged back into the fuel tank via activation of the onboard pump. Responsive to the updated canister loading state, the canister purge schedule may be updated accordingly. Method 400 may then end.

As indicated above, method 400 is specifically described with regard to FIG. 3B, wherein FLVV and GVVs are not included in the fuel system. However, it should be understood that pressurizing a fuel tank responsive to an indication that the fuel tank is full may additionally be conducted in a vehicle wherein the fuel system comprises an FLVV and GVVs, as described above with regard to FIG. 3A.

Furthermore, in some examples, instead of pressurizing the fuel system responsive to an indication that the fuel tank is full, the refueling valve may commanded to close, or the FLVV may seal the fuel tank, wherein an automatic shutoff may be induced. In such an example, if subsequent to an initial automatic shutoff event it is indicated that one or more additional automatic shutoff events occur, the fuel tank may subsequently be pressurized, for example by commanding open the refueling valve and activating the onboard pump to prevent further addition of fuel to the fuel tank.

Turning now to FIG. 5, a flow chart for an example method 500 for preventing overfilling of a fuel tank is shown. More specifically, method 500 includes, upon indication that a vehicle operator has not selected a desired fuel amount to be added to the fuel tank from an onboard human machine interface as detailed in the method described in FIG. 4, refueling of the fuel tank may be conducted, and responsive to an indication of the fuel tank reaching capacity, an onboard pump may be activated in order to pressurize the fuel tank in order to induce an automatic shutoff of a refueling dispenser, and the pressure may be maintained until the refueling event is indicated to be completed, to prevent additional fuel from being added to the fuel tank subsequent to the initial automatic shutoff. In this way, responsive to a full fuel tank (e.g., 100% capacity), trickle-filling of the fuel tank may be prevented, thereby preventing liquid fuel entering one or more evaporative emissions control system lines and potentially entering the fuel vapor canister. Method 500 will be described with reference to the systems described herein and as shown in FIGS. 1-3, though it should be understood that similar methods may be applied to other systems without departing from the scope of this disclosure. It may be appreciated that method 500 specifically relates to the fuel system illustrated in FIG. 3B, wherein the FLVV and GVVs are not included. As such, reference will be made where appropriate as to the applicability of the method herein described with regard to the fuel system illustrated in FIG. 3A. Method 500 may be carried out by a controller holding executable instructions in non-transitory memory, such as controller 212 in FIG. 2. The controller may employ engine actuators of the engine system to adjust engine operation, according to the method described below. It should be understood that the method 500 may be applied to other systems of a different configuration without departing from the scope of this disclosure.

Method 500 begins at 510 and includes depressurizing the fuel tank. At 510, depressurizing the fuel tank may comprise depressurizing the fuel tank as described above with regard to FIG. 4. Briefly, at 510, method 500 may include the controller commanding open a refueling valve (e.g., 252), and opening or maintaining open a vent path between the fuel vapor canister and atmosphere (e.g. open CVV and/or ELCM changeover valve in a venting position), while maintaining a canister purge valve (e.g., CPV 261) closed, to depressurize the fuel tank before enabling fuel to be added therein. The refueling valve and canister vent path may be maintained open for the duration of the refueling event, to allow refueling vapors to be flowed to the fuel vapor canister, and to allow gasses stripped of refueling vapors to be flowed to atmosphere.

Proceeding to 515, method 500 includes monitoring fuel level in the fuel tank during refueling. Monitoring fuel level may include the control system receiving information regarding the level of fuel stored in the fuel tank via one or more fuel level sensors, either continuously or at predetermined intervals over the duration of the refueling event. As described above at with regard to FIG. 4, a fuel level sensor may comprise a float connected to a variable resistor, such as fuel level sensor 234, or a radar or ultrasonic fuel level sensor (e.g., 317).

Continuing at 520, method 500 includes determining whether the fuel tank is full (or nearly full as described in more detail below). If at 520 it is indicated that the fuel tank is not full, method 500 proceeds to 525 and includes indicating whether the refueling event is complete. For example, completion of refueling at 525 may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. If at 525 it is indicated that refueling is not complete, method 500 may proceed to 515 wherein the fuel level in the fuel tank may be continued to be monitored during refueling. Alternatively, if at 525 it is indicated that refueling is complete, method 500 proceeds to 530 and includes closing the refueling valve to seal the fuel tank. As a desired amount of fuel was not indicated by the vehicle operator prior to refueling, and the refueling event was indicated to be completed, no automatic shutoff may be induced responsive to refueling the vehicle below capacity manually.

Proceeding to 532, method 500 includes updating vehicle operating conditions based on the refueling event. For example, a dashboard fuel gage, fuel level based parameters such as miles-to-empty, a canister loading state based on an estimated amount of hydrocarbons adsorbed by the fuel vapor canister, and a canister purge schedule may be updated. Method 500 may then end.

Returning to 520, if it is indicated that the fuel tank is full, method 500 proceeds to 535 and includes maintaining open the refueling valve and activating the onboard pump (e.g. ELCM 295) to pressurize the fuel tank. The rest of method 500 proceeding from 535 is essentially the same as the method depicted in FIG. 4, proceeding from 475. As such, the steps of the method will be reiterated briefly herein, but it should be understood that any details/description of method 400 proceeding from 475 not reiterated herein with regard to FIG. 5 may be understood to be included in method 500 proceeding from 535. As discussed above with regard to FIG. 4, maintaining open the refueling valve and activating the onboard pump may direct air through the fuel vapor canister to the fuel tank, thereby pressurizing the fuel tank in order to induce an automatic shutoff of the refueling dispenser. The pump may be activated at a percent duty cycle such that the automatic shutoff of the refueling dispenser may occur within a predetermined time duration subsequent to pump activation, and may further be duty cycled such that the pressure in the fuel tank remains above a predetermined pressure required to induce an automatic shutoff of the refueling dispenser.

Proceeding to 540, method 500 includes monitoring fuel vapor canister temperature at a load port of the fuel vapor canister in order to determine whether a canister temperature decrease greater than a threshold canister temperature decrease is indicated. A temperature decrease greater than a threshold temperature decrease may indicate that hydrocarbons are being desorbed in the vicinity of the load port, thus indicating the rest of the fuel vapor canister is free of hydrocarbons.

If, at 540, a canister temperature decrease greater than a threshold is indicated, method 500 proceeds to 545 and includes stopping the onboard pump. Stopping the pump when a temperature decrease greater than a threshold is indicated ensures that air free of hydrocarbons is not pushed into the fuel tank.

Method 500 proceeds to 546, and includes closing the refueling valve. As described above, by closing the refueling valve, pressure may build in the fuel tank thus inducing an automatic shutoff of the refueling dispenser. As 547, method 500 includes indicating whether an automatic shutoff event has occurred. If, at 547, an automatic shutoff is not indicated, method 500 includes returning to 546, and maintaining closed the refueling valve. Alternatively, if at 547 an automatic shutoff event is indicated, method 500 proceeds to 548 and includes depressurizing the fuel tank, for example by commanding open the refueling valve, and when the fuel tank pressure is indicated to reach a predetermined threshold, commanding closed the refueling valve to seal the fuel tank.

Proceeding to 549, method 500 includes indicating whether the refueling event is complete. For example, completion of refueling may include an indication that a refueling nozzle has been removed from the fuel filler neck, replacement of a fuel cap, closing of a refueling door, etc. If at 549 it is indicated that refueling is not complete, method 500 may return to 548 and may include maintaining closed the refueling valve. Alternatively, if at 549 it is indicated that refueling is complete, method 500 proceeds to 571, where vehicle operating conditions are updated based on the refueling event. For example a dashboard fuel gage, fuel level based parameters such as miles-to-empty, a canister loading state, and a canister purge schedule may be updated. More specifically, a canister loading state may be updated to indicate that the fuel vapor canister is free of hydrocarbons subsequent to the refueling event, and a canister purge schedule may be updated accordingly. In on example, updating a canister purge schedule may include postponing a canister purge at the next engine-on event. Method 500 may then end.

Returning to 540, if it is indicated that fuel vapor canister temperature decrease is not greater than a threshold, method 500 proceeds to 555. At 555, method 500 includes indicating whether a fuel tank pressure is greater than a threshold, wherein the threshold may be a fuel tank pressure greater than a pressure level that may induce an automatic shutoff of the refueling dispenser (e.g., 16 InH20). If at 555 it is indicated that fuel tank pressure is above a threshold, method 500 proceeds to 560 and includes decreasing the fuel tank pressure to a predetermined value that may induce an automatic shutoff of the refueling dispenser (e.g., 10 In H2O), but which is not greater than a threshold (e.g., 16 InH20), wherein decreasing the pressure may involve duty cycling the COV inside the pump (e.g., ELCM 295) open until the pressure decreases below the threshold.

Returning to 555, if it is indicated that fuel tank pressure is not greater than a threshold, method 500 may proceed to 565. At 565, method 500 includes indicating whether refueling is complete. For example, at 565 completion of refueling may be indicated when the fuel level has plateaued (due to an automatic shutoff event), and when it is indicated that a refueling nozzle has been removed from the fuel filler neck, a fuel cap has been replaced, and/or a refueling door has been indicated to close. For example, if the fuel level has plateaued yet it is not indicated that one or more of the refueling nozzle has been removed, the fuel cap has been replaced, and/or the refueling door is closed, then method 500 returns to 535 and includes maintaining open the refueling valve and maintaining activation of the onboard pump. By maintaining a predetermined pressure in the fuel tank, trickle-filling of the fuel tank may be prevented as any attempt to trickle-fill the tank may result in rapid automatic shutoff of the refueling dispenser.

Returning to 565, if it is indicated that refueling of the fuel tank is complete, method 500 proceeds to 570 and includes stopping the onboard pump, depressurizing the fuel tank by maintaining the refueling valve open, and subsequently closing the refueling valve responsive to a fuel tank pressure reaching a predetermined pressure threshold.

Proceeding to 571, method 500 includes updating vehicle operating conditions based on the refueling event. For example, a dashboard fuel gage, fuel level based parameters such as miles-to-empty, a canister loading state, and a canister purge schedule may be updated. More specifically, a canister loading state may be updated to indicate a fuel vapor canister loading state based on an estimated amount of hydrocarbons loaded into the fuel vapor canister during the refueling event minus the amount purged back into the fuel tank via activation of the onboard pump. Responsive to the updated canister loading state, the canister purge schedule may be updated accordingly. Method 500 may then end.

As indicated above, method 500 is specifically described with regard to FIG. 3B, wherein FLVV and GVVs are not included in the fuel system. However, it should be understood that pressurizing a fuel tank responsive to an indication that the fuel tank is full may additionally be conducted in a vehicle wherein the fuel system comprises an FLVV and GVVs, as described above with regard to FIG. 3A.

Furthermore, in some examples wherein a desired amount of fuel is not selected prior to commencing a refueling event, instead of pressurizing the fuel system responsive to an indication that the fuel tank is full, the refueling valve may commanded to close, or the FLVV may seal the fuel tank, wherein an automatic shutoff may be induced. In such an example, if subsequent to an initial automatic shutoff event it is indicated that one or more additional automatic shutoff events occur, the fuel tank may subsequently be pressurized, for example by commanding open the refueling valve and activating the onboard pump to prevent further addition of fuel to the fuel tank.

FIG. 6 shows an example timeline for automatically stopping refueling of a fuel tank after a preselected desired amount of fuel has been added to the fuel tank using methods described herein and with respect to FIG. 4, as applied to the systems described herein and with reference to FIGS. 1-3B. Timeline 600 includes plot 605, indicating whether a desired refuel amount has been selected by a vehicle operator, over time. Timeline 600 further includes plot 610, indicating whether a refueling valve (e.g., 252) is open or closed, over time. Timeline 600 further includes plot 615, indicating a fuel level in a fuel tank, over time. Line 616 represents a fuel level that may be attained subsequent to refueling the fuel tank with the desired fuel amount selected by a vehicle operator. Line 617 represents a fuel level in a fuel tank indicating a fuel tank filled to capacity with fuel. Timeline 600 further includes plot 620, indicating a fuel tank pressure, as monitored by a fuel tank pressure transducer (e.g., FTPT 291), over time. Line 621 represents atmospheric pressure, and line 622 represents a fuel tank pressure wherein an automatic shutoff of a refueling dispenser may occur. Timeline 600 further includes plot 625, indicating a fuel flow rate during a refueling operation, over time. Timeline 600 further includes plot 630, indicating whether a refueling event is complete, over time.

At time $t_0$ a desired refueling amount is selected by a vehicle operator, indicated by plot 605. For example, selecting a desired refueling amount may comprise a vehicle operator interacting with a human machine interface located within the vehicle, such as a touch screen, a voice command, wireless transmission via a wireless device, etc. As a desired refueling amount has been selected by the vehicle operator, a refueling valve may be commanded open, indicated by plot 610. By commanding open the refueling valve (while maintaining open or commanding open a canister vent valve), the fuel tank may be depressurized prior to commencing refueling. As refueling has not yet been initiated, fuel is not indicated to be flowing from a refueling dispenser, indicated by plot 625, and refueling is not complete, indicated by plot 630.

Between time $t_0$ and $t_1$ the fuel tank is depressurized, resulting from the refueling valve being open. At time $t_1$, responsive to pressure in the fuel tank reaching atmospheric pressure, indicated by line 621, refueling of the vehicle commences, indicated by plot 625. As such, between time $t_1$ and $t_2$ pressure in the fuel tank rises, and the level of fuel in the fuel tank increases, indicated by plot 615. Between time $t_2$ and $t_3$ pressure in the fuel tank remains constant, as a result of the constant fuel flow rate from the refueling dispenser, and the level of fuel in the fuel tank continues to rise.

At time $t_3$ just prior to the fuel level in the fuel tank reaching the fuel level indicating that the vehicle operator-selected amount of fuel has been added to the tank, represented by line 616, the refueling valve is closed. As described above, the closing of the refueling valve prior to the fuel level reaching the fuel level indicating the desired amount of fuel has been added to the tank may be based on a calculation including fuel flow rate, fuel tank fill level, size/geometry of the fuel tank, etc., such that the actual amount of fuel requested may be added to the tank by compensating for the additional fuel that may be added to the tank during the time in which pressure increases in the tank.

Between time $t_3$ and $t_4$ while the refueling valve is closed and with fuel continuing to be dispensed from the refueling dispenser, pressure rapidly builds in the tank, and at time $t_4$ pressure in the fuel tank reaches a threshold, represented by line 622. As such, an automatic shutoff of the refueling dispenser occurs, indicated by line 625.

Between time $t_4$ and $t_5$ fuel level in the fuel tank is indicated to plateau at the fuel level comprising the addition of fuel corresponding to the amount selected to add by the vehicle operator. Furthermore, as the refueling valve is closed, pressure in the fuel tank does not change. As such, it is indicated that an automatic shutoff event occurred, and accordingly, at time $t_5$ the refueling valve is commanded open in order to relieve the pressure in the fuel tank. Accordingly, between time $t_5$ and $t_6$ pressure in the fuel tank drops to atmospheric pressure, represented by line 621. At time $t_6$ it is indicated that the refueling event is complete. For example, an indication that refueling is complete may comprise an indication that a refueling nozzle has been removed from the fuel filler next, a fuel cap has been replaced, a refueling door has been closed, etc. As such, at time $t_6$ the refueling valve is commanded closed to seal the fuel tank, and the selected refuel amount may be reset, as the refueling event has ended. Between time $t_6$ and $t_7$ as the refueling valve is closed thus sealing the fuel tank, pressure in the tank is observed to build slightly due to the warm fuel temperature resulting from the recent refueling event.

Figure 7:
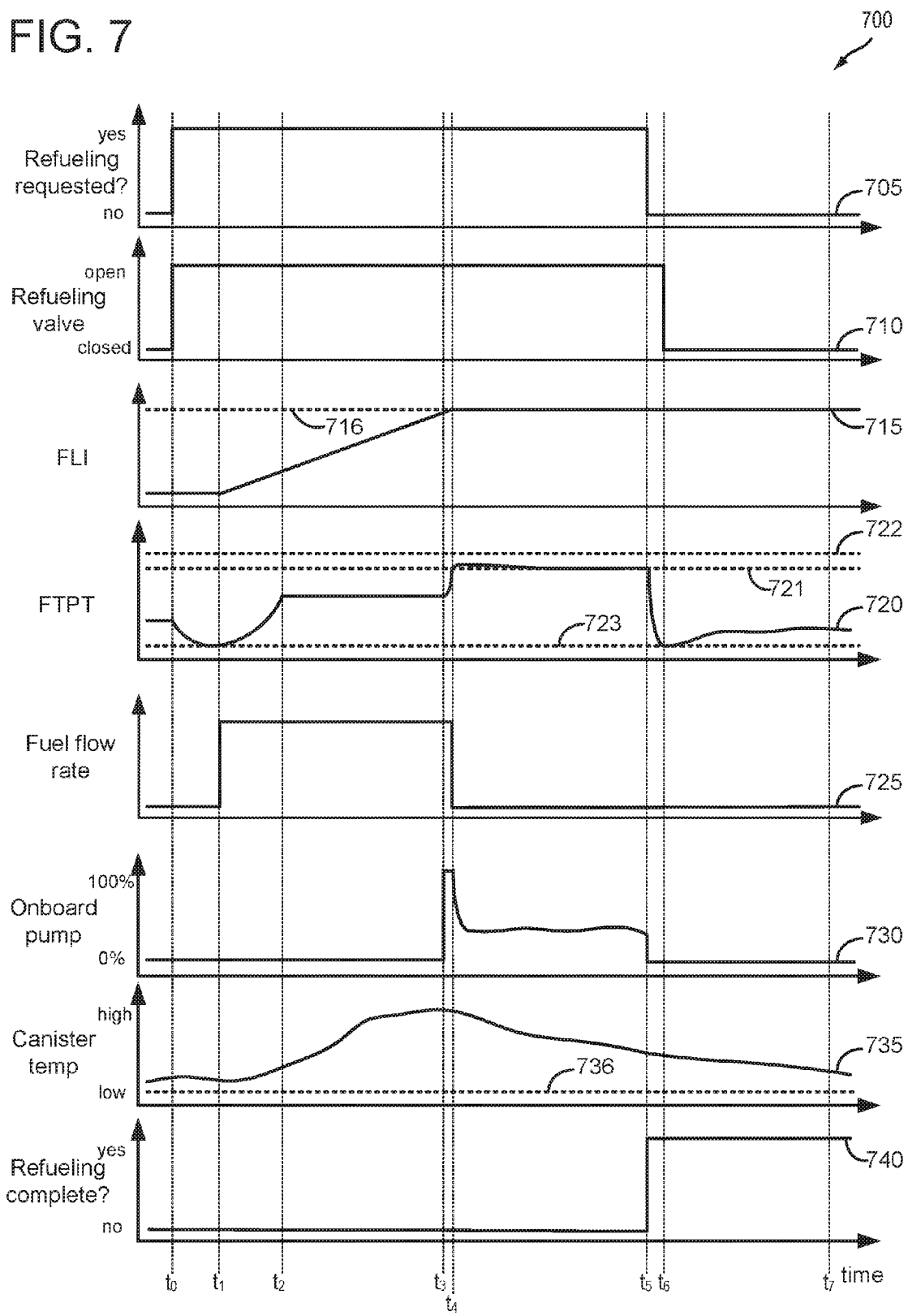
FIG. 7 shows an example timeline for preventing overfilling of a fuel tank during refueling according to the method of FIG. 5.

FIG. 7 shows an example timeline for preventing overfilling of a fuel tank during refueling using the methods described herein and with respect to FIG. 5, as applied to the systems described herein and with reference to FIGS. 1-3. Timeline 700 includes plot 705, indicating whether a refueling event has been requested, over time. Timeline 700 further includes plot 710, indicating the open of closed state of a refueling valve (e.g., 252), over time. Timeline 700 further includes plot 715, indicating a fuel level in a fuel tank, over time. Line 716 represents a fuel level corresponding to a fuel tank filled to capacity. Timeline 700 further includes plot 720, indicating a fuel tank pressure as monitored by a fuel tank pressure transducer (e.g., FTPT 291) over time. Line 723 represents atmospheric pressure. Line 721 represents a predetermined pressure that may induce an automatic shutoff of a refueling dispenser, and line 722 represents a pressure level in a fuel tank wherein, if reached, pressure in the fuel tank may need to be reduced. Timeline 700 further includes plot 725, indicating a fuel flow rate during a refueling operation, over time. Timeline 700 further includes plot 730, indicating the percent duty cycle of an onboard pump (e.g., ELCM 295), over time. Timeline 700 further includes plot 735, indicating a fuel vapor canister temperature as measured by a temperature sensor (e.g., 232) positioned at a load port of the fuel vapor canister, over time. Line 736 represents a threshold canister temperature, wherein if reached during the directing of air through the fuel vapor canister en route to the fuel tank, the fuel vapor canister may be indicated to be free of hydrocarbons. Timeline 700 further includes plot 740, indicating whether refueling is complete, over time.

At time $t_0$ a request for refueling is indicated, represented by plot 705. A refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. Accordingly, a refueling valve is commanded open to depressurize the fuel tank. As refueling has not been initiated, fuel is not indicated to be flowing from a refueling dispenser, indicated by plot 725. Additionally, the onboard pump (e.g., ELCM 295) is off. Canister temperature is indicated to be low, as the refueling valve was closed during a previous drive cycle prior to requesting refueling, thus preventing fuel vapors from being routed from the fuel tank to the fuel vapor canister.

Between time $t_0$ and $t_1$ the fuel tank is depressurized, resulting from the refueling valve being open. At time $t_1$, responsive to pressure in the fuel tank reaching atmospheric pressure, represented by line 723, refueling of the vehicle commences, indicated by plot 725. As such, between time $t_1$ and $t_2$ pressure in the fuel tank rises, indicated by plot 720, and the level of fuel in the fuel tank increases, indicated by plot 715. Additionally, as fuel is being added to the fuel tank, fuel vapors are routed to the fuel vapor canister, thus resulting in an increase in canister temperature, as measured by the temperature sensor positioned at the load port of the fuel vapor canister, indicated by plot 735. Between time $t_2$ and $t_3$ pressure in the fuel tank remains constant, as a result of the constant fuel flow rate from the refueling dispenser, and the level of fuel in the fuel tank continues to rise. Furthermore, temperature of the fuel vapor canister is indicated to rise further, and plateau, as the region of the fuel vapor canister monitored by the temperature becomes saturated with hydrocarbons.

At time $t_3$ just prior to the fuel level in the fuel tank reaching the fuel level indicating that the vehicle operator-selected amount of fuel has been added to the tank (in this example a fuel level indicating the fuel tank is nearly full), represented by line 716, the onboard pump is activated to pressurize the fuel tank, indicated by plot 730. Accordingly, the refueling valve is maintained open, indicated by plot 710. The pump may be activated at a percent duty cycle such that the automatic shutoff of the refueling dispenser may occur within a predetermined time duration subsequent to pump activation. The pump may further be duty cycled such that the pressure in the fuel tank remains above a predetermined pressure required to induce an automatic shutoff of the refueling dispenser. As such, as described previously above the pump may initially be activated at a predetermined percent duty cycle, and following the fuel tank pressure reaching the predetermined pressure for inducing an automatic shutoff as monitored by a fuel tank pressure transducer (e.g., FTPT 291), the percent duty cycle may be reduced such that pressure in the fuel tank is maintained and the fuel tank is not overpressurized.

Accordingly, between time $t_3$ and $t_4$ pressure in the fuel tank rapidly rises, indicated by plot 720, and the duty cycle of the onboard pump is maintained. At time $t_4$ pressure in the fuel tank reaches a predetermined pressure at which an automatic shutoff of a refueling dispenser results, indicated by plot 725. Additionally, the fuel level reaches the threshold fuel level, represented by line 716, indicating that the fuel tank is at capacity.

Between time $t_4$ and $t_5$ pressure in the fuel tank is maintained at a level at which an automatic shutoff of the refueling dispenser may occur if further addition of fuel were attempted. To maintain the fuel tank pressure, the duty cycle of the onboard pump is decreased to a duty cycle wherein the pressure in the fuel tank is held nearly constant. As such, a threshold fuel tank pressure, represented by line 722, is not reached. Additionally, as the onboard pump is directing air through the fuel vapor canister to the fuel tank, hydrocarbons are desorbed from the fuel vapor canister. As such, fuel vapor canister temperature near the load port is observed to decrease, indicated by plot 735, but a threshold fuel vapor canister is not reached, represented by line 736, indicating that during the time period between time $t_4$ and $t_5$, the fuel vapor canister is not completely purged of hydrocarbons. Furthermore, between time $t_4$ and $t_5$, pressure in the fuel tank is maintained as a result of the refueling event not being indicated to be completed, as indicated by plot 740. For example, although an automatic shutoff event occurred at time $t_4$, indicated by plot 725, pressure in the fuel tank is maintained between $t_4$ and $t_5$ to prevent additional fuel from being added to the fuel tank via "trickle filling".

At time $t_5$, the refueling event is indicated to be complete, indicated by plot 740. For example, an indication that refueling is complete may comprise an indication that a refueling nozzle has been removed from the fuel filler next, a fuel cap has been replaced, a refueling door has been closed, etc. As refueling is indicated to be complete, accordingly refueling is no longer requested, indicated by plot 705. Furthermore, as the refueling event is indicated to be complete, the onboard pump is deactivated, indicated by plot 730.

Between time $t_5$ and $t_6$, the onboard pump is off, yet the refueling valve is maintained open in order to depressurize the fuel tank. Accordingly, pressure in the fuel tank is indicated to decrease to atmospheric pressure. At time $t_6$, pressure in the fuel tank reaches atmospheric pressure, represented by line 723. As such, the refueling valve is commanded closed in order to seal the fuel tank. Between time $t_6$ and $t_7$, as the refueling event is complete, canister temperature as monitored by the temperature sensor positioned at the load port of the fuel vapor canister continues to decline. Furthermore, pressure in the fuel tank is observed to build slightly due to the warm fuel temperature resulting from the recent refueling event.

In this way, responsive to a vehicle operator selecting a desired fuel level to add to a fuel tank via an onboard human machine interface, the desired amount of fuel may be added to the vehicle wherein an automatic shutoff of the refueling event may be induced by closing of a refueling valve responsive to a fuel level indicated to be below the capacity of the fuel tank, and wherein responsive to an indication of the fuel level at capacity, an automatic shutoff of the refueling event may be induced by maintaining open the refueling valve and pressurizing the fuel tank via an onboard pump. Furthermore, responsive to pressurizing the fuel tank via an onboard pump, the pressure may be maintained above a threshold wherein further addition of fuel to the fuel tank may be prevented.

In a case wherein a vehicle operator does not select a desired fuel level to add to the fuel tank prior to commencing refueling, responsive to an indication that the fuel level has reached (or nearly reached) a threshold level, the onboard pump may similarly be activated to induce an automatic shutoff of the refueling dispenser and may similarly be maintained to prevent the further addition of fuel to the fuel tank.

Furthermore, the methods and systems described herein are enabled in a fuel system wherein fuel level vent valves and grade vent valves may not be included, thus reducing costs and complexity of the fuel system. However, it may be appreciated that the above-described methods may be additionally enabled in a fuel system comprising a refueling valve (and a pressure relief valve) in addition to a fuel level vent valve and grade vent valves.

The technical effect of preventing the overfilling of a fuel tank responsive to an indication that a fuel level in the fuel tank has reached (or nearly reached) the capacity of the fuel tank is to enable active control over the pressure in the fuel tank. By enabling active control over the pressure in the fuel tank via the use of an onboard pump, the pressure may be maintained above a level wherein the addition of fuel to the fuel tank subsequent to an initial automatic shutoff may be prevented, and wherein overpressurization of the fuel tank may be avoided.

In another representation, responsive to an indication that a fuel level has reached (or nearly reached) the capacity of the fuel tank, rather than pressurize the fuel tank via an onboard pump to induce an automatic shutoff of the refueling event, either a refueling valve may be commanded closed, or an FLVV may be mechanically-induced to close, thereby resulting in a pressure increase in the fuel tank that may induce an automatic shutoff of the refueling dispenser. In such a representation, responsive to an indication of one or more automatic shutoff events following an initial automatic shutoff event (e.g., three automatic shutoff events), an onboard pump may be activated to pressurize the fuel tank in order to prevent additional fuel from being added to the fuel tank. In a case wherein the refueling valve was commanded closed in order to induce the automatic shutoff event, the refueling valve may be commanded open prior to pressurizing the fuel tank with the onboard pump. Alternatively, in the case wherein the FLVV induced the automatic shutoff, if equipped, the refueling valve may be maintained open and the onboard pump activated in order to pressurize the fuel system.

The systems described herein and with reference to FIGS. 1-3B, along with the methods described herein and with reference to FIGS. 4-5 may enable one or more systems and one or more methods. In one example, a method comprises a vehicle operator selecting a desired fuel amount to add to a fuel tank that supplies fuel to an engine; during refueling the fuel tank, monitoring a fuel level in the fuel tank; and responsive to the fuel level indicating that the desired fuel amount has been added to the fuel tank: in a first condition, including the fuel level below a threshold fuel level, sealing the fuel tank; and in a second condition, including the fuel level reaching the threshold fuel level, pressurizing the fuel tank with an onboard pump. In a first example of the method, the method further comprises selectively coupling the fuel tank to an evaporative emissions control system via a refueling valve; selectively coupling the evaporative emissions control system to atmosphere via a canister vent valve; adsorbing hydrocarbons in an adsorbent material contained within a fuel vapor canister which is housed within the evaporative emissions control system; and opening both the refueling valve and the canister vent valve prior to refueling the fuel tank to route fuel vapors to the fuel vapor canister. A second example of the method optionally includes the first example and further includes wherein the first condition includes closing the refueling valve to seal the fuel tank; and wherein sealing the fuel tank during refueling results in an increase in pressure in the fuel tank that induces an automatic shutoff of a refueling dispenser. A third example of the method optionally includes any one or more or each of the first and second examples and further includes wherein the onboard pump is housed within a conduit coupling the fuel vapor canister to atmosphere; and wherein the second condition includes maintaining the refueling valve open and pressurizing the fuel tank with the onboard pump to induce an automatic shutoff of a refueling dispenser. A fourth example of the method optionally includes any one or more or each of the first through third examples and further comprises indicating a fuel tank pressure by a fuel tank pressure sensor; monitoring the fuel tank pressure during the second condition; and responsive to the fuel tank pressure above a fuel tank pressure threshold: reducing the fuel tank pressure to a predetermined fuel tank pressure below the fuel tank pressure threshold. A fifth example of the method optionally includes any one or more or each of the first through fourth examples and further includes wherein during the second condition, pressurizing the fuel tank with the onboard pump directs air flow through the fuel vapor canister to the fuel tank and results in desorption of hydrocarbons from the fuel vapor canister; and wherein desorption of hydrocarbons from the fuel vapor canister results in a decrease in temperature. A sixth example of the method optionally includes any one or more or each of the first through fifth examples and further comprises monitoring a fuel vapor canister temperature by a temperature sensor positioned within the fuel vapor canister; and indicating that the fuel vapor canister is free of adsorbed hydrocarbons in response to a threshold fuel vapor canister temperature decrease. A seventh example of the method optionally includes any one or more or each of the first through sixth examples and further comprises responsive to the indication of the threshold fuel vapor canister temperature decrease: stopping pressurizing the fuel tank with the onboard pump; and sealing the fuel tank by closing the refueling valve. An eighth example of the method optionally includes any one or more or each of the first through seventh examples and further comprises stopping pressurizing the fuel tank with the onboard pump responsive to completion of refueling; and sealing the fuel tank by closing the refueling valve. A ninth example of the method optionally includes any one or more or each of the first through eighth examples and further includes wherein completion of refueling is indicated by removal of the refueling dispenser from a fuel filler neck, and further comprising: maintaining pressurizing the fuel tank above the predetermined fuel tank pressure but below the fuel tank pressure threshold responsive to an indication that completion of refueling has not occurred. A tenth example of the method optionally includes any one or more or each of the first through ninth examples and further comprises monitoring fuel level in the fuel tank via a fuel level sensor positioned within the fuel tank; and wherein the fuel level sensor comprises radar or ultrasonic sensor. An eleventh example of the method optionally includes any one or more or each of the first through tenth examples and further includes wherein the fuel tank does not include a fuel tank vent valve configured to close responsive to the fuel level reaching a predetermined fuel level. A twelfth example of the method optionally includes any one or more or each of the first through eleventh examples and further includes wherein the threshold fuel level indicates a fuel tank at 100% capacity. A thirteenth example of the method optionally includes any one or more or each of the first through twelfth examples and further includes wherein selecting the desired fuel amount includes a vehicle operator selecting the desired fuel amount from a human machine interface onboard touch screen. A fourteenth examples of the method optionally includes any one or more or each of the first through thirteenth examples and further comprises selectively coupling the evaporative emissions control system to an intake manifold of the engine through a canister purge valve; during an engine-on condition; commanding open the canister purge valve, maintaining closed the refueling valve, and commanding open or maintaining open the canister vent valve to direct air through the evaporative emissions control system to the intake manifold to purge the evaporative emissions control system and fuel vapor canister of hydrocarbons; and responsive to completion of refueling: updating a canister purge schedule to reflect a canister loading state.

Another example of a method comprises during refueling a fuel tank that supplies fuel to an engine; monitoring a fuel level in the fuel tank; and responsive to an indication that the fuel tank is full: activating an onboard pump to pressurize the fuel tank to induce an automatic shutoff of a refueling dispenser. In a first example of the method, the method further comprises selectively coupling the fuel tank to an evaporative emissions control system through a refueling valve; adsorbing hydrocarbons in an adsorbent material contained in a fuel vapor canister housed within the evaporative emissions control system; monitoring temperature of the fuel vapor canister by a temperature sensor positioned within the fuel vapor canister; wherein pressurizing the fuel tank with the onboard pump directs air flow through the fuel vapor canister to the fuel tank via the refueling valve and results in desorption of hydrocarbons from the fuel vapor canister, desorption of hydrocarbons resulting in a temperature decrease indicated by the temperature sensor; and responsive to a fuel vapor canister temperature below a threshold during pressurizing the fuel tank: stopping pressurizing the fuel tank with the onboard pump; and sealing the fuel tank by closing the refueling valve. A second example of the method optionally includes the first example and further includes wherein responsive to the indication that the fuel tank is full the refueling valve is commanded closed to induce an initial automatic shutoff of the refueling dispenser; and wherein activating the onboard pump to pressurize the fuel tank to induce an automatic shutoff of a refueling dispenser occurs after an indication of one or more automatic shutoffs subsequent to the initial automatic shutoff of the refueling dispenser.

An example of a vehicle system comprises a fuel tank housed within in a fuel system coupled to a fuel vapor canister housed within an evaporative emissions control system via one or more vapor recovery lines; a refueling valve coupled between the fuel tank and the fuel vapor canister; a fuel tank pressure sensor; a canister vent valve coupled between the fuel vapor canister and atmosphere within a vent line; an onboard pump coupled to the vent line; a temperature sensor coupled within the fuel vapor canister; an onboard human machine interface; a fuel level sensor; and a controller, storing instructions in non-transitory memory, that when executed, cause the controller to: receive a request for a desired amount of fuel to be added to the fuel tank via the onboard human machine interface; open the refueling valve; monitor a fuel tank fill level during refueling of the fuel tank; and responsive to an indication that the desired amount of fuel to be added to the fuel tank has been added to the fuel tank: if the fuel tank fill level is below a capacity of the fuel tank, commanding closed the refueling valve in order to induce an automatic shutoff of a refueling dispenser; and if the fuel tank fill level reached the capacity of the fuel tank, activating the onboard pump to pressurize the fuel tank in order to induce an automatic shutoff of the refueling dispenser. In a first example, the vehicle system further comprises wherein the controller further stores instructions in non-transitory memory, that when executed, cause the controller to: during pressurizing the fuel tank in order to induce an automatic shutoff of the refueling dispenser; monitor a fuel tank pressure via the fuel tank pressure sensor; maintain the fuel tank pressure above a first pressure threshold wherein the refueling dispenser may be automatically shut off responsive to the addition of fuel to the fuel tank subsequent to one or more initial automatic shutoff events; monitor a fuel vapor canister temperature via the temperature sensor coupled within the fuel vapor canister; and responsive to an indication of a threshold fuel vapor canister temperature decrease: stopping pressurizing the fuel tank with the onboard pump; and sealing the fuel tank by closing the refueling valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   a vehicle operator selecting a desired fuel amount to add to a fuel tank that supplies fuel to an engine;
   during refueling the fuel tank, monitoring a fuel level in the fuel tank; and
   responsive to the fuel level indicating that the desired fuel amount has been added to the fuel tank:
      in a first condition, including the fuel level below a threshold fuel level, sealing the fuel tank; and
      in a second condition, including the fuel level reaching the threshold fuel level, pressurizing the fuel tank with an onboard pump.

2. The method of claim 1, further comprising:
   selectively coupling the fuel tank to an evaporative emissions control system via a refueling valve;
   selectively coupling the evaporative emissions control system to atmosphere via a canister vent valve;
   adsorbing hydrocarbons in an adsorbent material contained within a fuel vapor canister which is housed within the evaporative emissions control system; and
   opening both the refueling valve and the canister vent valve prior to refueling the fuel tank to route fuel vapors to the fuel vapor canister.

3. The method of claim 2, wherein the first condition includes closing the refueling valve to seal the fuel tank; and
   wherein sealing the fuel tank during refueling results in an increase in pressure in the fuel tank that induces an automatic shutoff of a refueling dispenser.

4. The method of claim 2, wherein the onboard pump is housed within a conduit coupling the fuel vapor canister to atmosphere; and
   wherein the second condition includes maintaining the refueling valve open and pressurizing the fuel tank with the onboard pump to induce an automatic shutoff of a refueling dispenser.

5. The method of claim 4, further comprising:
   indicating a fuel tank pressure by a fuel tank pressure sensor;
   monitoring the fuel tank pressure during the second condition; and
   responsive to the fuel tank pressure above a fuel tank pressure threshold:
      reducing the fuel tank pressure to a predetermined fuel tank pressure below the fuel tank pressure threshold.

6. The method of claim 4, wherein during the second condition, pressurizing the fuel tank with the onboard pump directs air flow through the fuel vapor canister to the fuel tank and results in desorption of hydrocarbons from the fuel vapor canister; and
   wherein desorption of hydrocarbons from the fuel vapor canister results in a decrease in temperature.

7. The method of claim 6, further comprising:
   monitoring a fuel vapor canister temperature by a temperature sensor positioned within the fuel vapor canister; and
   indicating that the fuel vapor canister is free of adsorbed hydrocarbons in response to a threshold fuel vapor canister temperature decrease.

8. The method of claim 7, further comprising:
   responsive to the indication of the threshold fuel vapor canister temperature decrease:
      stopping pressurizing the fuel tank with the onboard pump; and
      sealing the fuel tank by closing the refueling valve.

9. The method of claim 5, further comprising:
   stopping pressurizing the fuel tank with the onboard pump responsive to completion of refueling; and
   sealing the fuel tank by closing the refueling valve.

10. The method of claim 9, wherein completion of refueling is indicated by removal of the refueling dispenser from a fuel filler neck, and further comprising:
    maintaining pressurizing the fuel tank above the predetermined fuel tank pressure but below the fuel tank pressure threshold responsive to an indication that completion of refueling has not occurred.

11. The method of claim 1, further comprising:
    monitoring the fuel level in the fuel tank via a fuel level sensor positioned within the fuel tank; and
    wherein the fuel level sensor comprises a radar or ultrasonic sensor.

12. The method of claim 1, wherein the fuel tank does not include a fuel tank vent valve configured to close responsive to the fuel level reaching a predetermined fuel level.

13. The method of claim 1, wherein the threshold fuel level indicates a fuel tank at 100% capacity.

14. The method of claim 1, wherein selecting the desired fuel amount includes the vehicle operator selecting the desired fuel amount from a human machine interface onboard touch screen.

15. The method of claim 10, further comprising:
    selectively coupling the evaporative emissions control system to an intake manifold of the engine through a canister purge valve;

during an engine-on condition:
commanding open the canister purge valve, maintaining closed the refueling valve, and commanding open or maintaining open the canister vent valve to direct air through the evaporative emissions control system to the intake manifold to purge the evaporative emissions control system and fuel vapor canister of hydrocarbons; and responsive to completion of refueling:
updating a canister purge schedule to reflect a canister loading state.

* * * * *